US010581741B2

(12) United States Patent
Wood et al.

(10) Patent No.: US 10,581,741 B2
(45) Date of Patent: *Mar. 3, 2020

(54) METHOD AND SYSTEM FOR INTEREST GROUPS IN A CONTENT CENTRIC NETWORK

(71) Applicant: Cisco Technology, Inc., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/120,643

(22) Filed: Sep. 4, 2018

(65) Prior Publication Data
US 2018/0375771 A1    Dec. 27, 2018

Related U.S. Application Data

(63) Continuation of application No. 15/194,135, filed on Jun. 27, 2016, now Pat. No. 10,148,572.

(51) Int. Cl.
*H04L 12/745* (2013.01)
*H04L 29/08* (2006.01)
(Continued)

(52) U.S. Cl.
CPC ............ *H04L 45/748* (2013.01); *H04L 45/20* (2013.01); *H04L 45/306* (2013.01); *H04L 45/34* (2013.01);
(Continued)

(58) Field of Classification Search
CPC ....... H04L 45/748; H04L 45/20; H04L 47/32; H04L 67/2842; H04L 45/306; H04L 67/327; H04L 45/34
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

International Search Report and Written Opinion in counterpart International Application No. PCT/US2017/039159, dated Sep. 9, 2017, 9 pages.

(Continued)

*Primary Examiner* — Ajay Cattungal

(57) ABSTRACT

One embodiment provides a system for facilitating efficient communication of an interest group packet indicating a collection of interests. During operation, the system receives, by an intermediate node, a first packet which has a name and indicates a set of member interests, wherein a member interest has a name, wherein a name is a hierarchically structured variable length identifier that includes contiguous name components ordered from a most general level to a most specific level. In response to obtaining a content object which satisfies a member interest, the system removes the indicated member interest from the first packet. The system adds an entry in a pending interest table for the first packet, wherein the entry indicates the name for the first packet, the name for each member interest, and an indicator of whether each member interest is satisfied. The system transmits the first packet to another node.

20 Claims, 8 Drawing Sheets

(51) Int. Cl.
　　*H04L 12/721* 　　　(2013.01)
　　*H04L 12/733* 　　　(2013.01)
　　*H04L 12/823* 　　　(2013.01)
　　*H04L 12/725* 　　　(2013.01)

(52) U.S. Cl.
　　CPC .......... *H04L 47/32* (2013.01); *H04L 67/2842*
　　　　　　　　(2013.01); *H04L 67/327* (2013.01)

(56) References Cited

U.S. PATENT DOCUMENTS

| | | | |
|---|---|---|---|
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |
| 5,845,207 | A | 12/1998 | Amin |
| 5,870,605 | A | 2/1999 | Bracho |
| 6,052,683 | A | 4/2000 | Irwin |
| 6,085,320 | A | 7/2000 | Kaliski, Jr. |
| 6,091,724 | A | 7/2000 | Chandra |
| 6,128,623 | A | 10/2000 | Mattis |
| 6,128,627 | A | 10/2000 | Mattis |
| 6,173,364 | B1 | 1/2001 | Zenchelsky |
| 6,209,003 | B1 | 3/2001 | Mattis |
| 6,226,618 | B1 | 5/2001 | Downs |
| 6,233,617 | B1 | 5/2001 | Rothwein |
| 6,233,646 | B1 | 5/2001 | Hahm |
| 6,289,358 | B1 | 9/2001 | Mattis |
| 6,292,880 | B1 | 9/2001 | Mattis |
| 6,332,158 | B1 | 12/2001 | Risley |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,732,273 | B1 | 5/2004 | Byers |
| 6,769,066 | B1 | 7/2004 | Botros |
| 6,772,333 | B1 | 8/2004 | Brendel |
| 6,775,258 | B1 | 8/2004 | vanValkenburg |
| 6,862,280 | B1 | 3/2005 | Bertagna |
| 6,901,452 | B1 | 5/2005 | Bertagna |
| 6,915,307 | B1 | 7/2005 | Mattis |
| 6,917,985 | B2 | 7/2005 | Madruga |
| 6,957,228 | B1 | 10/2005 | Graser |
| 6,968,393 | B1 | 11/2005 | Chen |
| 6,981,029 | B1 | 12/2005 | Menditto |
| 7,007,024 | B2 | 2/2006 | Zelenka |
| 7,013,389 | B1 | 3/2006 | Srivastava |
| 7,031,308 | B2 | 4/2006 | Garcia-Luna-Aceves |
| 7,043,637 | B2 | 5/2006 | Bolosky |
| 7,061,877 | B1 | 6/2006 | Gummalla |
| 7,080,073 | B1 | 7/2006 | Jiang |
| RE39,360 | E | 10/2006 | Aziz |
| 7,149,750 | B2 | 12/2006 | Chadwick |
| 7,152,094 | B1 | 12/2006 | Jannu |
| 7,177,646 | B2 | 2/2007 | ONeill |
| 7,206,860 | B2 | 4/2007 | Murakami |
| 7,206,861 | B1 | 4/2007 | Callon |
| 7,210,326 | B2 | 5/2007 | Kawamoto |
| 7,246,159 | B2 | 7/2007 | Aggarwal |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,362,727 | B1 | 4/2008 | ONeill |
| 7,382,787 | B1 | 6/2008 | Barnes |
| 7,395,507 | B2 | 7/2008 | Robarts |
| 7,430,755 | B1 | 9/2008 | Hughes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,542,471 | B2 | 6/2009 | Samuels |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,564,812 | B1 | 7/2009 | Elliott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,636,767 | B2 | 12/2009 | Lev-Ran |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,698,559 | B1 | 4/2010 | Chaudhury |
| 7,769,887 | B1 | 8/2010 | Bhattacharyya |
| 7,779,467 | B2 | 8/2010 | Choi |
| 7,801,069 | B2 | 9/2010 | Cheung |
| 7,801,177 | B2 | 9/2010 | Luss |
| 7,816,441 | B2 | 10/2010 | Elizalde |
| 7,831,733 | B2 | 11/2010 | Sultan |
| 7,873,619 | B1 | 1/2011 | Faibish |
| 7,908,337 | B2 | 3/2011 | Garcia-Luna-Aceves |
| 7,924,837 | B1 | 4/2011 | Shabtay |
| 7,953,014 | B2 | 5/2011 | Toda |
| 7,953,885 | B1 | 5/2011 | Devireddy |
| 7,979,912 | B1 | 7/2011 | Roka |
| 8,000,267 | B2 | 8/2011 | Solis |
| 8,010,691 | B2 | 8/2011 | Kollmansberger |
| 8,069,023 | B1 | 11/2011 | Frailong |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,271,687 | B2 | 9/2012 | Turner |
| 8,312,064 | B1 | 11/2012 | Gauvin |
| 8,332,357 | B1 | 12/2012 | Chung |
| 8,386,622 | B2 | 2/2013 | Jacobson |
| 8,447,851 | B1 | 5/2013 | Anderson |
| 8,462,781 | B2 | 6/2013 | McGhee |
| 8,467,297 | B2 | 6/2013 | Liu |
| 8,473,633 | B2 | 6/2013 | Eardley |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,677,451 | B1 | 3/2014 | Bhimaraju |
| 8,688,619 | B1 | 4/2014 | Ezick |
| 8,699,350 | B1 | 4/2014 | Kumar |
| 8,718,055 | B2 | 5/2014 | Vasseur |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qlan |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 | 9/2014 | Kim |
| 8,832,302 | B1 | 9/2014 | Bradford |
| 8,836,536 | B2 | 9/2014 | Marwah |
| 8,861,356 | B2 | 10/2014 | Kozat |
| 8,862,774 | B2 | 10/2014 | Vasseur |
| 8,868,779 | B2 | 10/2014 | ONeill |
| 8,874,842 | B1 | 10/2014 | Kimmel |
| 8,880,682 | B2 | 11/2014 | Bishop |
| 8,903,756 | B2 | 12/2014 | Zhao |
| 8,923,293 | B2 | 12/2014 | Jacobson |
| 8,934,496 | B2 | 1/2015 | Vasseur |
| 8,937,865 | B1 | 1/2015 | Kumar |

(56) References Cited

U.S. PATENT DOCUMENTS

| | | | |
|---|---|---|---|
| 8,972,969 B2 | 3/2015 | Gaither | |
| 8,977,596 B2 | 3/2015 | Montulli | |
| 9,002,921 B2 | 4/2015 | Westphal | |
| 9,032,095 B1 | 5/2015 | Traina | |
| 9,071,498 B2 | 6/2015 | Beser | |
| 9,112,895 B1 | 8/2015 | Lin | |
| 9,253,087 B2 | 2/2016 | Zhang | |
| 9,280,610 B2 | 3/2016 | Gruber | |
| 10,148,572 B2* | 12/2018 | Wood | H04L 45/20 |
| 2002/0002680 A1 | 1/2002 | Carbajal | |
| 2002/0010795 A1 | 1/2002 | Brown | |
| 2002/0038296 A1 | 3/2002 | Margolus | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0152305 A1 | 10/2002 | Jackson | |
| 2002/0176404 A1 | 11/2002 | Girard | |
| 2002/0188605 A1 | 12/2002 | Adya | |
| 2002/0199014 A1 | 12/2002 | Yang | |
| 2003/0004621 A1 | 1/2003 | Bousquet | |
| 2003/0009365 A1 | 1/2003 | Tynan | |
| 2003/0033394 A1 | 2/2003 | Stine | |
| 2003/0046396 A1 | 3/2003 | Richter | |
| 2003/0046421 A1 | 3/2003 | Horvitz et al. | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0061384 A1 | 3/2003 | Nakatani | |
| 2003/0074472 A1 | 4/2003 | Lucco | |
| 2003/0088696 A1 | 5/2003 | McCanne | |
| 2003/0097447 A1 | 5/2003 | Johnston | |
| 2003/0099237 A1 | 5/2003 | Mitra | |
| 2003/0140257 A1 | 7/2003 | Peterka | |
| 2003/0229892 A1 | 12/2003 | Sardera | |
| 2004/0024879 A1 | 2/2004 | Dingman | |
| 2004/0030602 A1 | 2/2004 | Rosenquist | |
| 2004/0064737 A1 | 4/2004 | Milliken | |
| 2004/0071140 A1 | 4/2004 | Jason | |
| 2004/0073617 A1 | 4/2004 | Milliken | |
| 2004/0073715 A1 | 4/2004 | Folkes | |
| 2004/0139230 A1 | 7/2004 | Kim | |
| 2004/0196783 A1 | 10/2004 | Shinomiya | |
| 2004/0221047 A1 | 11/2004 | Grover | |
| 2004/0225627 A1 | 11/2004 | Botros | |
| 2004/0233916 A1 | 11/2004 | Takeuchi | |
| 2004/0246902 A1 | 12/2004 | Weinstein | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0132207 A1 | 6/2005 | Mourab | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0281288 A1 | 12/2005 | Banerjee | |
| 2005/0286535 A1 | 12/2005 | Shrum | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0099973 A1 | 5/2006 | Nair | |
| 2006/0129514 A1 | 6/2006 | Watanabe | |
| 2006/0133343 A1 | 6/2006 | Huang | |
| 2006/0146686 A1 | 7/2006 | Kim | |
| 2006/0173831 A1 | 8/2006 | Basso | |
| 2006/0193295 A1 | 8/2006 | White | |
| 2006/0203804 A1 | 9/2006 | Whitmore | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0242155 A1 | 10/2006 | Moore | |
| 2006/0256767 A1 | 11/2006 | Suzuki | |
| 2006/0268792 A1 | 11/2006 | Belcea | |
| 2007/0019619 A1 | 1/2007 | Foster | |
| 2007/0073888 A1 | 3/2007 | Madhok | |
| 2007/0094265 A1 | 4/2007 | Korkus | |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0160062 A1 | 7/2007 | Morishita | |
| 2007/0162394 A1 | 7/2007 | Zager | |
| 2007/0171828 A1 | 7/2007 | Dalal | |
| 2007/0189284 A1 | 8/2007 | Kecskemeti | |
| 2007/0195765 A1 | 8/2007 | Heissenbuttel | |
| 2007/0204011 A1 | 8/2007 | Shaver | |
| 2007/0209067 A1 | 9/2007 | Fogel | |
| 2007/0239892 A1 | 10/2007 | Ott | |
| 2007/0240207 A1 | 10/2007 | Belakhdar | |
| 2007/0245034 A1 | 10/2007 | Retana | |
| 2007/0253418 A1 | 11/2007 | Shiri | |
| 2007/0255677 A1 | 11/2007 | Alexander | |
| 2007/0255699 A1 | 11/2007 | Sreenivas | |
| 2007/0255781 A1 | 11/2007 | Li | |
| 2007/0274504 A1 | 11/2007 | Maes | |
| 2007/0275701 A1 | 11/2007 | Jonker | |
| 2007/0276907 A1 | 11/2007 | Maes | |
| 2007/0283158 A1 | 12/2007 | Danseglio | |
| 2007/0294187 A1 | 12/2007 | Scherrer | |
| 2008/0005056 A1 | 1/2008 | Stelzig | |
| 2008/0005223 A1 | 1/2008 | Flake | |
| 2008/0010366 A1 | 1/2008 | Duggan | |
| 2008/0037420 A1 | 2/2008 | Tang | |
| 2008/0043989 A1 | 2/2008 | Furutono | |
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0082662 A1 | 4/2008 | Dandliker | |
| 2008/0101357 A1 | 5/2008 | Iovanna | |
| 2008/0107034 A1 | 5/2008 | Jetcheva | |
| 2008/0107259 A1 | 5/2008 | Satou | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0165775 A1 | 7/2008 | Das | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0250006 A1 | 10/2008 | Dettinger | |
| 2008/0253237 A1* | 10/2008 | Fu | H04H 20/38 369/1 |
| 2008/0256138 A1 | 10/2008 | Sim-Tang | |
| 2008/0256359 A1 | 10/2008 | Kahn | |
| 2008/0270618 A1 | 10/2008 | Rosenberg | |
| 2008/0271143 A1 | 10/2008 | Stephens | |
| 2008/0287142 A1 | 11/2008 | Keighran | |
| 2008/0288580 A1 | 11/2008 | Wang | |
| 2008/0298376 A1 | 12/2008 | Takeda | |
| 2008/0320148 A1 | 12/2008 | Capuozzo | |
| 2009/0006659 A1 | 1/2009 | Collins | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |
| 2009/0052660 A1 | 2/2009 | Chen | |
| 2009/0067429 A1 | 3/2009 | Nagai | |
| 2009/0077184 A1 | 3/2009 | Brewer | |
| 2009/0092043 A1 | 4/2009 | Lapuh | |
| 2009/0097631 A1 | 4/2009 | Gisby | |
| 2009/0103515 A1 | 4/2009 | Pointer | |
| 2009/0113068 A1 | 4/2009 | Fujihira | |

(56) References Cited

U.S. PATENT DOCUMENTS

| | | |
|---|---|---|
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274156 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0072206 A1* | 3/2011 | Ross ................ H04L 67/1097 711/108 |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2011/0307451 A1* | 12/2011 | El Haddi .............. G06F 16/164 707/673 |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284290 A1* | 11/2012 | Keebler ................ G06F 16/958 707/756 |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |

(56) References Cited

U.S. PATENT DOCUMENTS

| | | |
|---|---|---|
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0349961 A1 | 12/2015 | Mosko |
| 2015/0372903 A1 | 12/2015 | Hui |
| 2015/0381546 A1 | 12/2015 | Mahadevan |
| 2016/0014215 A1* | 1/2016 | Oran .................. G06F 16/9566 709/219 |
| 2016/0021172 A1 | 1/2016 | Mahadevan |
| 2016/0110466 A1* | 4/2016 | Uzun ................. H04L 63/1458 707/751 |
| 2016/0255139 A1* | 9/2016 | Rathod ................. H04L 67/10 709/203 |
| 2017/0034240 A1* | 2/2017 | Scott .................. H04L 67/2842 |
| 2017/0373974 A1 | 12/2017 | Wood et al. |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A | 11/2009 |
| EP | 2214357 A | 8/2010 |
| EP | 2214357 A1 | 8/2010 |
| EP | 2323346 | 5/2011 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |
| WO | 2015084327 | 6/2015 |
| WO | 2016/010690 A1 | 1/2016 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communcations, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
An Jan Su, David R. Choffries, Aleksandar Kuzmanovic, and Fabian E. Bustamante. Drafting Behind Akamai: Inferring Network Conditions Based on CDN Redirections. IEEE/ACM Transactions on Networking (Feb. 2009).
B. Ahlgren et al., 'A Survey of Information-centric Networking' IEEE Commun. Magazine, Jul. 2012, pp. 26-36.
"PBC Library-Pairing-Based Cryptography—About," http://crypto.stanford.edu/pbc. downloaded Apr. 27, 2015.
Bari, MdFaizul, et al. 'A survey of naming and routing in information-centric networks.' Communications Magazine, IEEE 50 12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004, Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking," Local Computer Networks (LCN), 2013 IEEE 38th Conference on. IEEE, 2013.
Connor, William, et al. "A trust management framework for service-oriented environments." Proceedings of the 18th international conference on World wide web, ACM, 2009.
Content Centric Networking Project (CCN) [online], http://ccnx.org/releases/latest/doc/technical, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Bonch and M. Franklin. Identity-Based Encryption from the Well Pairing. Advances in Cryptology—CRYPTO 2001. vol. 2139, Springer Berlin Heidelberg (2001).
D.K. Smetters, P. Golle, and J.D. Thornton, "CCNx access control specifications," PARC, Tech. Rep., Jul. 2010.
Dahimmagharidam, Ali, Mariar Mirzazad Barijough, and J.J. Garcia Luna-Aceves. 'Understanding optimal caching and opportunistic caching at the edge of information-centric networks' Proceedings of the 1st international conference on information-centric networking, ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wen Hu Feijen, and A. J M Van Gasteren, "Derivation of a termination detection algorithm for distributed computations," Control Flow and Data Flow, concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakish S. K., Lin, Y., Tootoonchian, A., Ghodsi, A. Koponen, T., Maggs, B., & Shenker, S. (Aug. 2013), Less pain, most of the gain: Incrementaly deployable ICN. In ACM SIGCOMM Computer Communication Review vol. 43, No. 4, pp. 147-158), ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," In Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system," Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun, "Needle in a Haystack: Mitigating Content Poisoning in Named-Data Networking," Proceedings of NDSS Workshop on Security of Emerging Networking Technologies (SENT), 2014.
Ghodsi, Ali, et al. "Information-centric networking: seeing the forest for the trees." Proceedings of the 10th ACM Workshop on Hot Topics in Networks. ACM, 2011.

(56) References Cited

OTHER PUBLICATIONS

Ghodsi, Ali, et al. "Naming in content-oriented architectures." Proceedings of the ACM SIGCOMM workshop on Information-centric networking. ACM, 2011.
Gupta, Arijali, Barbara Liskov, and Rodrigo Rodrigues. "Efficient Routing for Peer-to-Peer Overlays." NSDI, vol. 4, 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 (2012).
Herlich, Matthias et al., "Optimizing Energy Efficiency for Bulk Transfer Networks", Apr. 13, 2010, pp. 1-3, retrieved for the Internet: URL:http://www.cs.um-paderborn.de/likeadmin/informationik/ag-karl/publications/miscellaneous/optimizing.pdf [retrieved on Mar. 9, 2012].
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwal, Chajermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A. Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kim, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China. Sep. 2013, pp. 552-559.
Katipamula, Srinivas, and Michael R. Brambley, "Review article: methods for fault detection, diagnostics, and prognostics for building systemsa review, Part I," HVAC&R Research 11.1 (2006): 3-25.
Katipamula, Srinivas, and Michael R. Brambley, "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin, "Coping with node misbehaviors in ad hoc networks: A multi-dimensional trust management approach." Mobile Data Management (MDM), 2012 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, JUn. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36 No. 4 ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, Eijzun, S. Sevilla, and J. Garcia-Luna-Aceves, "CCN krs A key resolution service for ccn," in Proceedings of the 1st International Conference on Information centric Networking, Ser. INC 14 New York, NY, USA: ACM, 2014, pp. 97-106. [Online]. Available http://doi.acm.org/10.11452060129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASIER: Encryption-based access control in social network with efficient revocation." in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in Information-centric networks: Design, Implementation, and analyses," in Proc. ACM SIGCOMM ICN 2013, Hong Kong, China, Aug. 2013, pp. 73-76.

(56) References Cited

OTHER PUBLICATIONS

S. Yu, C. Wang, K. Ren, and W. Lou, "Achieving secure, scalable, and fine-grained data access control in cloud computing," In Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Busnoy. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environment.' proceedings of the third ACM workshop on Challenged networks. ACM, 2008.
Sun, Ying, and Daniel S. Weld. "A framework for model-based repair." AAAI 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B. G. Chun, A. Ermolinskiy, K.H. Kim, S. Shenker and I. Stoica. 'A data-oriented (and beyond) network architectures,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data." In Proc. ACM CCS 2006, Alexandria, VA, USA. Oct.-Nov. 2006, pp. 89-98.
V. Jacobson, D.K. Smetters, J.D. Thornton, M.F. Plass, N.H. Briggs, and R.L. Braynard, 'Networking named content,' In Proc. ACM CoNEXT 2009, Rome, Italy, Dec. 2009, pp. 1-12.
V. K. Adhikari, S. Jain, Y. Chen, and Z.-L. Zhang, Vivisecting Youtube: An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS, Joint Workshop on Technical Challenges for Dependable Robots in Human Environments. Ed. Raja Chatia. Oct. 2002.
Vijay Kumar Adhikari, Yang Guo, Fang Hao, Matteo Varvello, Volker Hilt, Moritz Steiner, and Zhi-Li Zhang, Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systems," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Sprigner Berlin Heidelberg (2010).
RTMP (2009). Available online at http://wwwimages.adobe.com/ www.adobe.com/content/dam/Adobe/en/devnet/rtmp/ pdf/rtmp/ specification 1.0.pdf.
Hoque et al., "NLSR: Named-data Link State Routing Protocol", Aug. 12, 2013, ICN'13.
Nadeem, Javaid, "Analysis and design of quality link metrics for routing protocols in Wireless Networks", PhD Thesis Defense, Dec. 15, 2010, Universete Pans-Est.
Wetherall, David, "Active Network vision and reality: Lessons form a capsule-based system", ACM Symposium on Operating Systems Principles, Dec. 1, 1999, pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on

(56) References Cited

OTHER PUBLICATIONS the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Gamepud Panmale et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf paragraphs [01.3], [002], [02.1], [0003].

Akash Baid et al "Comparing alternative approaches for networking of named objects in the future internet", Computer Communications Workshops (Infocom Wkshps), 2012 IEEE Conference on, IEEE Mar. 25, 2012, pp. 298-303, Paragraph [002] figure 1.

Priya Mahadevan: "CCNx 1.0 Tutorial", Mar. 16, 2014, pp. 1-11, Retrieved from the Internet: http://www.cnnx.org/pubs/ccnx/1.2%20CCNx%201 0%20Tutorial.pdf [rerieved on Jun. 8, 2016] paragraphs [003]-[006], [0011], [0013].

Marc Moske et al "All-In-One Streams for Content Centric Networks", May 24, 2015, retrieved from the Internet: http://www.ccnx.org/pubs/AllInOne.pdf [downloaded Jun. 9, 2016] the whole document.

Cesar Ghati et al. "Elements of Trust in Named-Data Networking", Feb. 13, 2014 Retrieved from the internet Jun. 17, 2015 http://arxiv.org/pdf/1402.3332y5.pdf p. 5, col. 1 p. 2, col. 1-2 Section 4.1; p. 4, col. 2 Section 4 2 p. 4, col. 2.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

\* cited by examiner

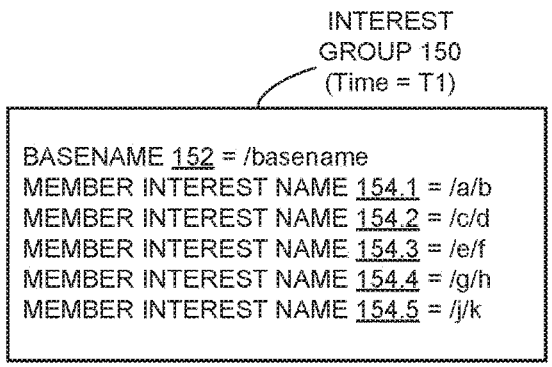

FIG. 1B

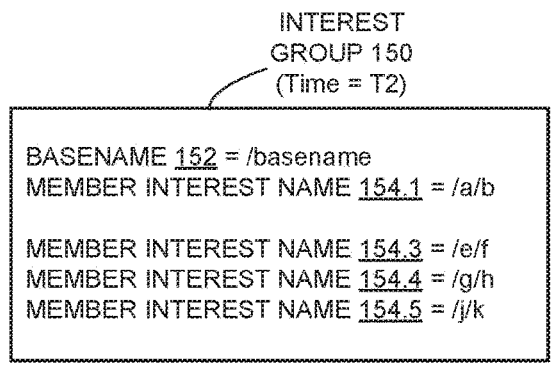

FIG. 1C

| NAME 132 | MEMBER INT INFO 134 = { MEMBER INT NAME 142, MEMBER INDIC 144 } | INCOMING INTERF 146 |
|---|---|---|
| /basename | { /a/b, 0 }<br>{ /c/d, 0 }<br>{ /e/f, 0 }<br>{ /g/h, 0 }<br>{ /j/k, 0 } | 1, 3, 5 |
| /single/interest1 | { null } | 3, 4, 8 |
| .... | .... | .... |

PIT ENTRY 131.1 (first row)
PIT ENTRY 131.2 (second row)
PENDING INTEREST TABLE 130 (TIME = T1)

FIG. 1D

| NAME 132 | MEMBER INT INFO 134 = { MEMBER INT NAME 142, MEMBER INDIC 144 } | INCOMING INTERF 146 |
|---|---|---|
| /basename | { /a/b, 0 }<br>{ /c/d, 1 }<br>{ /e/f, 0 }<br>{ /g/h, 0 }<br>{ /j/k, 0 } | 1, 3, 5 |
| /single/interest1 | { null } | 3, 4, 8 |
| .... | .... | .... |

PIT ENTRY 131.1
PENDING INTEREST TABLE 130 (TIME = T2)

FIG. 1E

TABLE
200

InterestGroup 202    := BaseName [KeyIDRestr] InterestSet+
InterestSet 204      := [DecomposeHopCount] [DecomposePrefix]
                        [DecomposeAction] InterestList+

DecomposeHopCount 206  := INTEGER
DecomposePrefix 208    := Name
DecomposeAction 210    := "INDIVIDUAL"

InterestList 212    := Interest+
Interest 214        := Name [KeyIdRestr] [ContentObjectHashRestr]

BaseName 216              := Name
Name 218                  := CCNx Name
KeyIdRestr 220            := BLOB
ContentObjectHashRestr 222 := BLOB
BLOB 224                  := OCTET+

FIG. 2

METHOD AND SYSTEM FOR INTEREST GROUPS IN A CONTENT CENTRIC NETWORK

RELATED APPLICATION

This application is a continuation of U.S. application Ser. No. 15/194,135, filed Jun. 27, 2016, the entirety of which is incorporated herein by reference. The subject matter of this application is also related to the subject matter in the following applications: U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515"); the disclosures of which are herein incorporated by reference in their entirety.

BACKGROUND

Field

This disclosure is generally related to distribution of digital content. More specifically, this disclosure is related to a method and system for efficient communication of a collection of distinct interests.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending an interest packet for content and receiving a content object packet (or a manifest) in return. A CCN interest and a content object (or a manifest) are identified by their unique names, which are typically hierarchically structured variable length identifiers (HSVLI). An HSVLI can include contiguous name components ordered from a most general level to a most specific level. A manifest is a content object which indicates a collection of "member" content objects based on a name for each member content object. A manifest can be represented in a tree-like topology, and a member content object can be a data object or another manifest. An entity in possession of a manifest can retrieve the member content objects by transmitting one interest for each member content object based on the indicated name. Manifests are described in U.S. patent application Ser. No. 14/231,515.

As an interest packet is routed through the network from a content requesting node to a content producing node, each intermediate CCN router adds an entry in its pending interest table (PIT) corresponding to the interest and forwards the interest to the next CCN router. When a matching content object packet is sent from the content producing node back to the requesting node, it follows the reverse path of the interest. Each intermediate CCN router forwards the content object along the requesting or arrival interfaces listed in the corresponding PIT entry, and subsequently removes the PIT entry, indicating that the interest has been fulfilled.

The current CCN protocol is based on a one-to-one symmetry. That is, one interest is used to retrieve one content object or manifest. However, when the names of multiple content objects are known a priori, or obtained from a manifest, a requesting consumer may realize an additional burden in sending one individual interest for each content object. Furthermore, each intermediate router stores one entry for each symmetrical interest and content object exchange. This may result in an inefficient system and decrease the effectiveness of data distribution in the network.

SUMMARY

One embodiment provides a system for facilitating efficient communication of an interest group packet indicating a collection of interests. During operation, the system receives, by an intermediate node, a first packet which has a name and indicates a set of member interests, wherein a member interest has a name, wherein a name is a hierarchically structured variable length identifier that includes contiguous name components ordered from a most general level to a most specific level. In response to obtaining a content object which satisfies a member interest, the system removes the indicated member interest from the first packet. The system adds an entry in a pending interest table for the first packet, wherein the entry indicates the name for the first packet, the name for each member interest, and an indicator of whether each member interest is satisfied. The system transmits the first packet to another node, thereby facilitating efficient communication of the set of member interests indicated in the first packet.

In some embodiments, the first packet further includes information associated with a condition for splitting the first packet into one or more individual interests, wherein an individual interest has a same name as a respective member interest of the first packet. The system processes the one or more individual interests.

In some embodiments, the information associated with the condition is a hop count which indicates a number of remaining hops until the first packet is to be split into the one or more individual interests. In response to determining that the hop count is equal to zero, the system splits the first packet into the one or more individual interests. The system discards the first packet, and forwards the one or more individual interests.

In some embodiments, the information associated with the condition is a name prefix. In response to determining that the name prefix matches an entry in a forwarding information base based on a longest prefix match, the system splits the first packet into the one or more individual interests, discards the first packet, and forwards the one or more individual interests.

In some embodiments, in processing an individual interest, the system performs a lookup in a cache for a matching content object based on a name for the individual interest. In response to obtaining the matching content object, the system forwards the matching content object to a previous-hop node, and removes from the pending interest table a matching entry, or removes from the matching entry an arrival interface associated with the individual interest. In response to not obtaining the matching content object, the system performs the following operations: the system performs a lookup in the pending interest table for the matching entry corresponding to the individual interest; in response to obtaining the matching entry, the system adds to the matching entry the arrival interface associated with the individual interest; in response to not obtaining the matching entry, the system adds a new entry corresponding to the individual interest; and the system forwards the individual interest.

In some embodiments, in response to obtaining a content object that satisfies a member interest, the system performs a lookup in the pending interest table for a matching entry corresponding to the first packet. In response to obtaining the matching entry, the system marks in the matching entry the indicator that the member interest is satisfied, and in response to determining that all member interests indicated in the matching entry are satisfied, the system removes the matching entry from the pending interest table. In response to not obtaining the matching entry, the system performs the following operations: in response to determining that one or more member interests are indicated in the first packet, the system adds the entry in the pending interest table for the first packet, wherein the added entry does not indicate the satisfied member interest, and the system forwards the first packet; and in response to determining that no member interests are indicated in the first packet, the system discards the first packet.

In some embodiments, in response to not obtaining a content object which satisfies a member interest, the system performs a lookup in the pending interest table for a matching entry corresponding to the first packet. In response to obtaining the matching entry, the system marks in the matching entry the indicator that the member interest is satisfied. In response to not obtaining the matching entry, the system adds the entry in the pending interest table for the first packet.

BRIEF DESCRIPTION OF THE FIGURES

FIG. 1B illustrates an exemplary interest group packet, in accordance with an embodiment of the present invention.

FIG. 1C illustrates an exemplary interest group packet, in accordance with an embodiment of the present invention.

FIG. 1D illustrates an exemplary pending interest table maintained by an intermediate node, in accordance with an embodiment of the present invention.

FIG. 1E illustrates an exemplary pending interest table maintained by an intermediate node, in accordance with an embodiment of the present invention.

FIG. 2 presents an exemplary table illustrating an exemplary interest group in Augmented Backus-Naur Form notation, in accordance with an embodiment of the present invention.

In the figures, like reference numerals refer to the same figure elements.

DETAILED DESCRIPTION

Figure 1A:
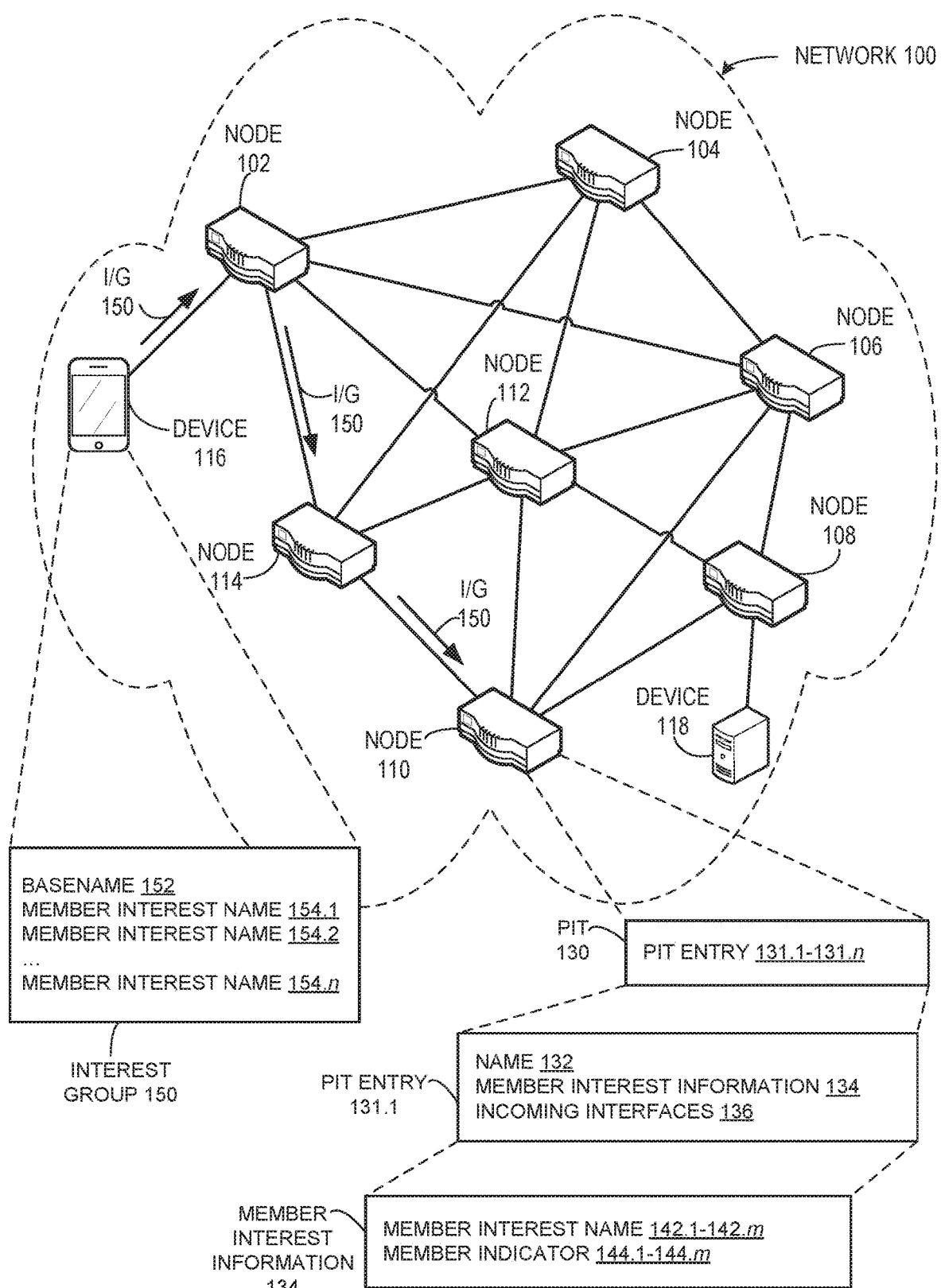
FIG. 1A illustrates an exemplary network that facilitates communication of an interest group packet indicating a collection of interests, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates efficient communication and distribution of content based on an interest group, which is a CCN composite message that represents or indicates a collection of distinct interests. A current CCN protocol is based on a one-to-one symmetry for an interest and a content object. That is, a consumer generates and transmits one interest, and receives one responsive content object from a producer (and/or intermediate routers). Each entity that receives the interest performs a lookup in its cache or content store (CS) for the matching content object, and also performs a lookup in its pending interest table (PIT), to either add a new entry for the interest or add (or aggregate) an arrival interface for an existing entry. Each entity that receives the content object also performs a similar lookup in its CS, and also performs a lookup in its PIT, to remove an existing entry or to remove an arrival interface for an existing entry.

A recent construction, known as "interest lists," proposes a type of CCN message which carries a collection of interests through the network. An interest list includes a name, just as an interest includes a name. Interest lists are described in Kurihara, et al., "List Interest: Packing Interests for Reduction of Router Workload in CCN 1.0." A forwarder stores an interest list in its PIT based on the name for the interest list. Furthermore, a forwarder performs a lookup in its content store for each constituent interest. If a match is found in the CS, the forwarder transmits the individual content object. If a match is not found in the CS, the forwarder transmits the interest list based on forwarding information. An interest list is only dropped when all interests in the interest list are satisfied. Thus, an interest list representing n individual interests solicits n individual content object responses. However, because an interest list is forwarded as a single message, an interest list contains interests that are ultimately forwarded to the same destination, which can create inefficiencies. Furthermore, interest lists do not dynamically decompose as they traverse the network, which can lead to further inefficiencies.

Embodiments of the present invention solve these problems by introducing a new type of CCN message: an "interest group." An interest group is similar to an interest list in that an interest group indicates a collection of "member" interests. However, an interest group also includes several key features not included in an interest list. First, an interest group can be truncated as it traverses the network. That is, an intermediate router can satisfy a member interest, and subsequently remove the indication of a satisfied member interest before forwarding the interest group onwards, as described below in relation to FIGS. 1B and 1C. Second, an interest group can indicate its member interests with names that are independent of the name for the interest group. Third, an interest group can include conditions which trigger an intermediate router to decompose its member interests. That is, interest group can be split into individual interests (or smaller interest groups or subsets of individual interests), where the individual interests match the member interests. For example, a trigger condition can occur upon reaching a pre-configured number of hops, or when an interest reaches a distinct topological portion of the network (e.g., an organizational boundary), as described below in relation to FIGS. 1F-1G.

Thus, the present system provides improvements to the distribution of digital content, where the improvements are fundamentally technological. Embodiments of the present invention provide a technological solution (e.g., using an interest group to transmit requests for digital content) to the technological problem of the efficient, secure, and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components pare, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1A illustrates an exemplary network 100 that facilitates communication of an interest group packet indicating a collection of interests, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102 and 114) or a core router (e.g., intermediate CCN routers 104-112). Each CCN router can maintain a pending interest table (PIT) (e.g., PIT 130 of node 110) and a forwarding information base (FIB) (not shown). PIT 130 can include PIT entries 131.1-131.n associated with pending interests. A PIT entry (e.g., PIT entry 131.1) can include a name 132, member interest information 134, and incoming interfaces 136. Member interest information 134 can include member interest names 142.1-142.m and member indicators 144.1-144.m. For example, member indicator 144.1 is an indicator (such as a flag or bit) of whether the interest by the name of member interest name 142.1 has been satisfied.

During operation, node device 116 can send an interest group 150, where interest group 150 indicates a collection of interests for data. Interest group 150 is a packet that can include a basename 152 and member interest names 154.1-154.n corresponding to each member interest. Basename 152 is not required to be related to member interest names 154.1-154p. In other words, member interest names 154.1-154p can be independent of and distinct from basename 152. An exemplary interest group packet is described below in relation to FIG. 1B. Interest group 150 can travel through network 100. Node 110 can receive interest group 150 and can perform a lookup in its CS for a matching content object based on, e.g., member interest name 154.1. If no matching content object is found in the CS, node 110 can perform a lookup in PIT 130 for a matching PIT entry corresponding to interest group 150, based on basename 152. If no matching PIT entry is found, node 110 can add a PIT entry for interest group 150. An exemplary PIT is described below in relation to FIG. 1D. For example, the added PIT entry can include name 132 with a value of basename 152, member interest names 142.1-142.m corresponding to member interest names 154.1-154.p, and corresponding member indicators 144.1-144.m. For a newly added PIT entry, member indicators 144.1-144.m can be set to a default value of "0" or a value that indicates that the corresponding member interest is not satisfied. Node 110 can then forward interest group 150 to a next-hop node (such as node 108) based on information in its FIB. If a matching PIT entry is found, node 110 can add the arrival interface of interest group 150 to the matching PIT entry, and then forward interest group 150.

If a matching content object for a member interest is found in the CS, node 110 can remove the indication of the satisfied member interest from the interest group, as described below in relation to FIGS. 1B and 1C, and forward the matching content object on a reverse path (e.g., via nodes 114 and 102). Node 110 can perform a lookup in PIT 130 for a matching PIT entry corresponding to interest group 150, based on basename 152. If no matching PIT entry is found, and no remaining member interests are indicated in interest group 150, node 110 can discard interest group 150. If there are any remaining member interests indicated in interest group 150, node 110 can add a PIT entry for interest group 150. For example, the added PIT entry can include name 132 with a value of basename 152, member interest names 142.1-142.m corresponding to member interest names 154.1-154.p, and corresponding member indicators 144.1-144.m. Note that the added PIT entry will not include the indication of any satisfied member interests which are previously removed from interest group 150.

If a matching PIT entry is found, node 110 can mark the appropriate member indicator as satisfied, where the marked member indicator corresponds to the member interest name for the satisfied interest (e.g., mark as satisfied indicator 144.1 corresponding to member interest name 142.1, which has a value that is the same as member interest name 154.1). An exemplary PIT showing the marking of a member indicator for a satisfied member interest is described below in relation to FIG. 1E. If all of the member interests indicated in the matching PIT entry are satisfied, node 110 can remove the matching PIT entry from the PIT. A detailed description of these operations can be found below in relation to FIGS. 1B-1E, 3A, and 3B.

Thus, embodiments of the present invention provide an effective solution for enabling 1-to-n interest to content object retrieval, where an interest group indicates a collection of member interests, and where an intermediate router can remove a satisfied member interest from the interest group before forwarding the interest group on. Furthermore, an interest group can include a triggering condition which indicates to an intermediate router to split the interest group into its constituent member interests. Decomposition is described below in relation to FIG. 4.

Exemplary Interest Groups and PITs

FIG. 1B illustrates an exemplary interest group packet 150, in accordance with an embodiment of the present invention. Interest group packet 150 (or interest group 150) at a time of T1 can include a basename 152 with a value of "/basename" and member interest names 154.1-154.5. For example, member interest name 154.1 is "/a/b," member interest name 154.2 is "/c/d," member interest name 154.3 is "/e/f," member interest name 154.4 is "/g/h," and member interest name 154.4 is "/j/k."

FIG. 1C illustrates an exemplary interest group packet 150, in accordance with an embodiment of the present invention. Interest group packet 150 (or interest group 150) at a time of T2 can include basename 152 with a value of "/basename" and member interest names 154.1, 154.3, 154.4, and 154.5. For example, member interest name 154.1 is "/a/b," member interest name 154.3 is "/e/f," member interest name 154.4 is "/g/h," and member interest name 154.4 is "/j/k." Note that at time T2, member interest name 154.2 has been removed from interest group 150 (as compared to the indicated member interests of interest group 150 at time T1 of FIG. 1B).

FIG. 1D illustrates an exemplary pending interest table 130 maintained by an intermediate node, in accordance with an embodiment of the present invention. PIT 130 reflects a PIT entry added upon receiving interest group 150 at a time of T1 (and determining that no matching content object exists in the CS). An entry in PIT 130 includes a name 132, member interest information 134, and incoming interfaces 146. Member interest information 134 can include a list of tuples comprised of a member interest name 142 and a corresponding member indicator 144. Incoming interfaces 146 can include a list of the interfaces on which the interest corresponding to name 132 has been received (e.g., the arrival interfaces associated with interest group 150). Thus, PIT entry 131.1 can include a name 132 of "/basename," and a list of member interest information as follows: {/a/b, 0}, {/c/d, 0}, {/e/f, 0}, {/g/h, 0}, {/j/k, 0}. PIT entry 131.1 can also include incoming interfaces 146 with a value of {1, 3, 5}. PIT 130 can also include an entry for a standard interest. For example, PIT entry 131.2 can include a name of "/single/interest1," member interest information with a null value, and incoming interfaces.

FIG. 1E illustrates an exemplary pending interest table 130 maintained by an intermediate node, in accordance with an embodiment of the present invention. PIT 130 reflects a PIT entry modified upon satisfying a member interest and removing the member interest from interest group 150 at a time of T2. For example, the member interest information for the second listed member interest is updated to reflect that it has been satisfied: {/c/d, 1}.

Note that PIT 130 in FIG. 1D at time T1 reflects an existing PIT entry 131.1 at a receiving node or router. If there is no existing PIT entry corresponding to the interest group base name of "/basename" at time T1, a new PIT entry is added only after the satisfied member interest is removed at time T2. In this case, PIT 130 in FIG. 1E at time T2 only includes member interest information for the remaining member interests, and does not include member interest information for the satisfied member interest (i.e., indicated by the name "/c/d").

Exemplary Interest Groups and PITs; Decomposition

Figure 1F:
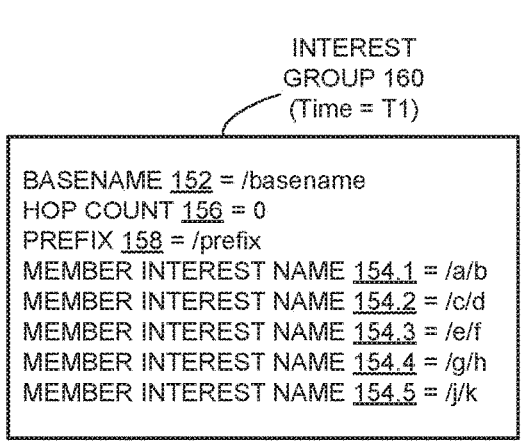
FIG. 1F illustrates an exemplary interest group packet, including information associated with a condition to split the interest group packet, in accordance with an embodiment of the present invention.

FIG. 1F illustrates an exemplary interest group packet 160, including information associated with a condition to split the interest group packet, in accordance with an embodiment of the present invention. Interest group packet 160 (or interest group 160) includes the same content as interest group 150 of FIG. 1B at a time of T1, and further includes a hop count 156 with a value equal to "0" and a prefix 158 with a value equal to "/prefix." A router that receives interest group 160 can determine a condition to decompose the interest group into individual interests, as described below in relation to FIG. 1G. For example, when hop count 156 has a value of zero, a receiving router can determine to decompose the interest group. In addition, when prefix 158 matches a prefix in a receiving router's FIB based on a longest prefix match, the receiving router can also determine to decompose the interest group.

Figure 1G:
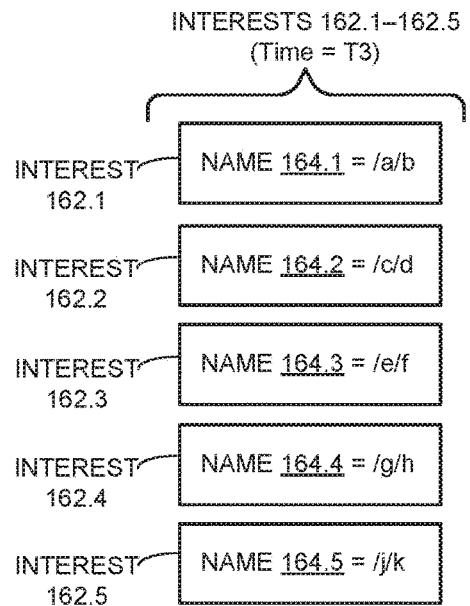
FIG. 1G illustrates exemplary interests created based on splitting the exemplary interest group packet of FIG. 1F, in accordance with an embodiment of the present invention.

FIG. 1G illustrates exemplary interests 162.1-162.5 created based on splitting the exemplary interest group packet of FIG. 1F, in accordance with an embodiment of the present invention. When the receiving router determines a condition to decompose the interest group, the router can create individual interests with names corresponding to the member interest names of the interest group, at a time of T3. For example, a receiving router can create five separate interests with the following names: interest 162.1 with a name 164.1 of "/a/b"; interest 162.2 with a name 164.2 of "/c/d"; interest 162.3 with a name 164.3 of "/e/f"; interest 162.4 with a name 164.4 of "/g/h"; and interest 162.5 with a name 164.5 of "/j/k." Interests 162.1-162.5 may be processed under standard CCN rules, as described below in relation to FIG. 4.

Figure 1H:
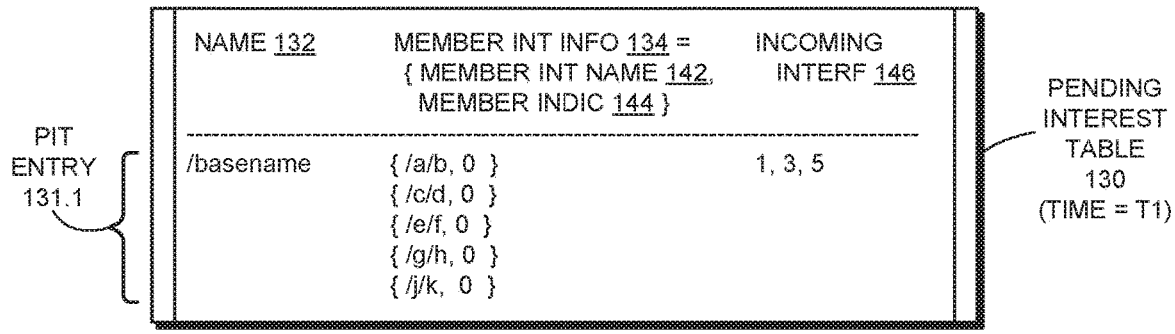
FIG. 1H illustrates an exemplary pending interest table maintained by an intermediate node, in accordance with an embodiment of the present invention.

FIG. 1H illustrates an exemplary pending interest table 130 maintained by an intermediate node, in accordance with an embodiment of the present invention. PIT 130 includes the same content as PIT 130 of FIG. 1D at a time of T1.

Figure 1I:
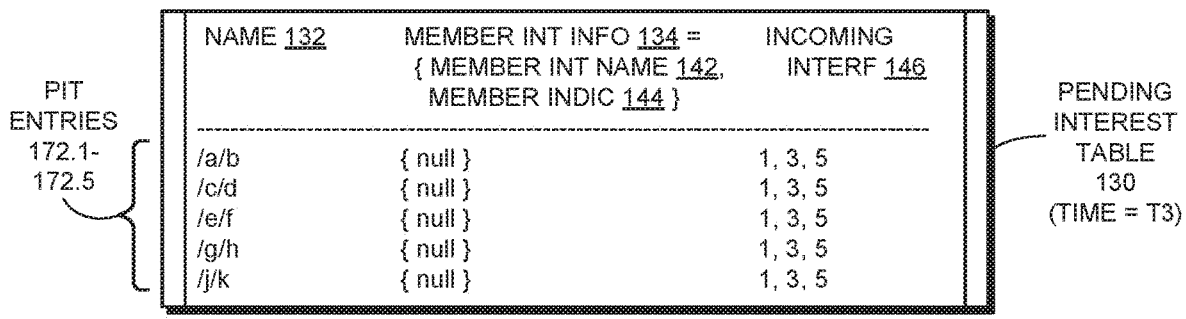
FIG. 1I illustrates an exemplary pending interest table maintained by an intermediate node, in accordance with an embodiment of the present invention.

FIG. 1I illustrates an exemplary pending interest table 130 maintained by an intermediate node, in accordance with an embodiment of the present invention. PIT 130 at a time of T3 corresponds to the individual interests created based on the receiving router detecting a decompose condition. PIT 130 at time T3 can include standard PIT entries 172.1-172.5. For example, PIT entry 172.1 can include a name of "/a/b," member interest information with a null value, and incoming interfaces.

Exemplary Interest Group in ABNF

FIG. 2 presents an exemplary table 200 illustrating an interest group in Augmented Backus-Naur Form (ABNF) notation, in accordance with an embodiment of the present invention. Table 200 includes an interest group 202, which includes a base name, an optional key identification restriction, and a list of interest sets. An interest set 204 can include an optional decompose hop count, an optional decompose prefix, an optional decompose action, and a set of interest lists. A decompose hop count 206 can be an integer, and can indicate a remaining number of hops until the interest set is to be split into one or more individual interests, i.e., split into the individual interests listed in the interest list for interest set 204. A decompose prefix 208 can be a name, and can indicate for a receiving router to split the interest set into one or more individual interests when the prefix matches an entry in a FIB of the router based on a longest prefix match. A decompose action 210 can be a string or command, and can indicate, e.g., "INDIVIDUAL" as the action to take when decompose hop count 206 has a value equal to zero, or when decompose prefix 208 matches a FIB entry in the router. Note that an interest group can include decompose conditions in addition to the ones described herein (e.g., hop count and name prefix). Furthermore, an interest group can include encrypted interest sets that may be re-encrypted, similar to onion encryption.

An interest list 212 can include a set of interests. An interest 214 can include a tuple defined by a name, an optional key identification restriction, and an optional content object hash restriction. A base name 216 can be a name, and a name 218 can be a CCN name, as described herein. A key identification restriction 220 and a content object hash restriction 222 can be a BLOB or other similar value, and a BLOB 224 can be a set of octets.

Intermediate Node Processes Interest Group

Figure 3A:
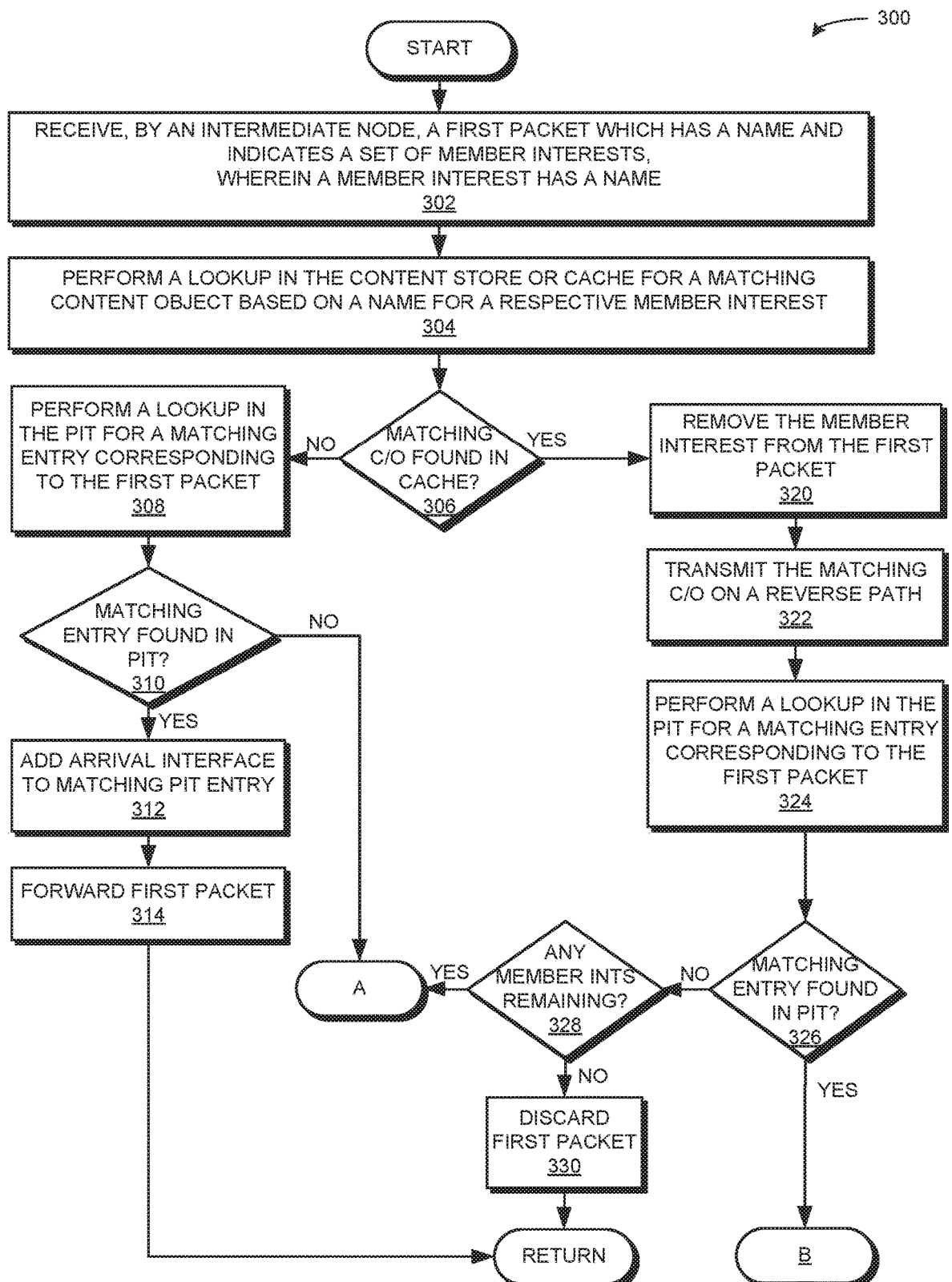
FIG. 3A presents a flow chart illustrating a method by an intermediate node for facilitating communication of an interest group packet indicating a collection of interests, in accordance with an embodiment of the present invention.

FIG. 3A presents a flow chart 300 illustrating a method by an intermediate node for facilitating communication of an interest group packet indicating a collection of interests, in accordance with an embodiment of the present invention. During operation, the system receives, by an intermediate node, a first packet which has a name and indicates a set of member interests, wherein a member interest has a name (operation 302). A name can be a hierarchically structured variable length identifier that includes contiguous name components ordered from a most general level to a most specific level. The first packet can be a manifest. The system performs a lookup in a local cache or content store (CS) for a matching content object based on a name for a respective member interest (operation 304). The system determines whether a matching content object is found in the CS (decision 306). The system can also determine whether it can obtain a matching content object. If no matching content object is found in the CS, the system performs a lookup in the PIT for a matching entry corresponding to the first packet, based on the name for the first packet (operation 308). If a matching entry is not found in the PIT (decision 310), the operation continues as described at Label A of FIG. 3B. If a matching entry is found in the PIT (decision 310), the system adds the arrival interface of the first packet to the matching PIT entry (operation 312) and forwards the first packet (operation 314). Note that a PIT entry can include a name for the first packet, the name for each member interests, and an indicator of whether the member interest is satisfied.

If a matching content object is found in the CS (decision 306), the system removes the member interest from the first packet (operation 320). The system transmits the matching content object on a reverse path (operation 322). The system performs a lookup in the PIT for a matching PIT entry corresponding to the first packet, based on the name for the first packet (operation 324). If a matching entry is not found in the PIT (decision 326), the system determines whether there are any remaining member interests indicated in the first packet (decision 328). If there are no remaining member interests indicated in the first packet, the system discards the first packet (operation 330), and the operation returns. If remaining member interests are indicated in the first packet (decision 328), the operation continues as described at Label A of FIG. 3B. If a matching entry is found in the PIT (decision 326), the operation continues as described at Label B of FIG. 3B.

Figure 3B:
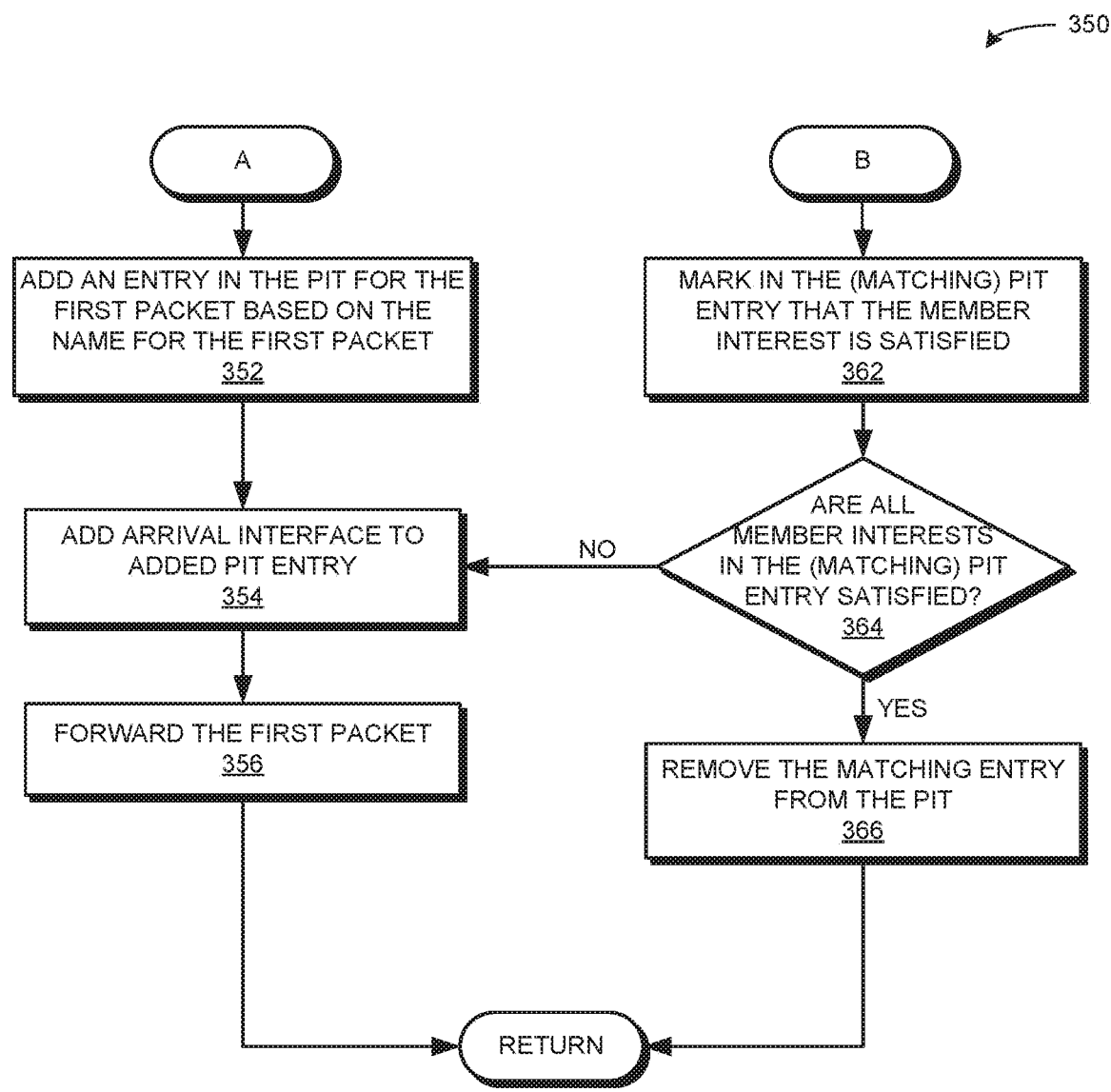
FIG. 3B presents a flow chart illustrating a method by an intermediate node for facilitating communication of an interest group packet indicating a collection of interests, in accordance with an embodiment of the present invention.

FIG. 3B presents a flow chart illustrating a method 350 by an intermediate node for facilitating communication of an interest group packet indicating a collection of interests, in accordance with an embodiment of the present invention. From Label A, the system adds an entry in the PIT for the first packet based on the name for the first packet (operation 352). Note that if the operation reaches Label A from decision 326 (matching content object found in CS) instead of decision 310 (no matching content object found in CS), the entry added to the PIT in operation 352 does not include the satisfied member interest. That is, the system has already removed the member interest from the first packet in operation 320. The system also adds the arrival interface to the added PIT entry (operation 354), and forwards the first packet (operation 356).

From Label B, the system marks in the (matching) PIT entry that the member interest is satisfied (operation 354). The system determines whether all member interests in the matching PIT entry are satisfied (decision 364). For example, the system can check an indicator in the matching PIT entry for each of the member interests indicated in the matching PIT entry. Alternatively, the system can check a single indicator which is based on the respective indicators for each of the member interests indicated in the matching PIT entry. Other methods may be used to determine whether a respective member interest in a PIT entry has been satisfied, including setting a flag, a bit, a reserved field, or other method. If all the member interests indicated in the matching PIT entry are satisfied (decision 364), the system removes the matching entry from the PIT (operation 366). If not all of the member interests indicated in the matching PIT entry are satisfied (decision 364), the system adds the arrival interface to the added PIT entry (operation 354), and forwards the first packet (operation 356).

Intermediate Node Processes Interest Group Packet with Decomposition

Figure 4:
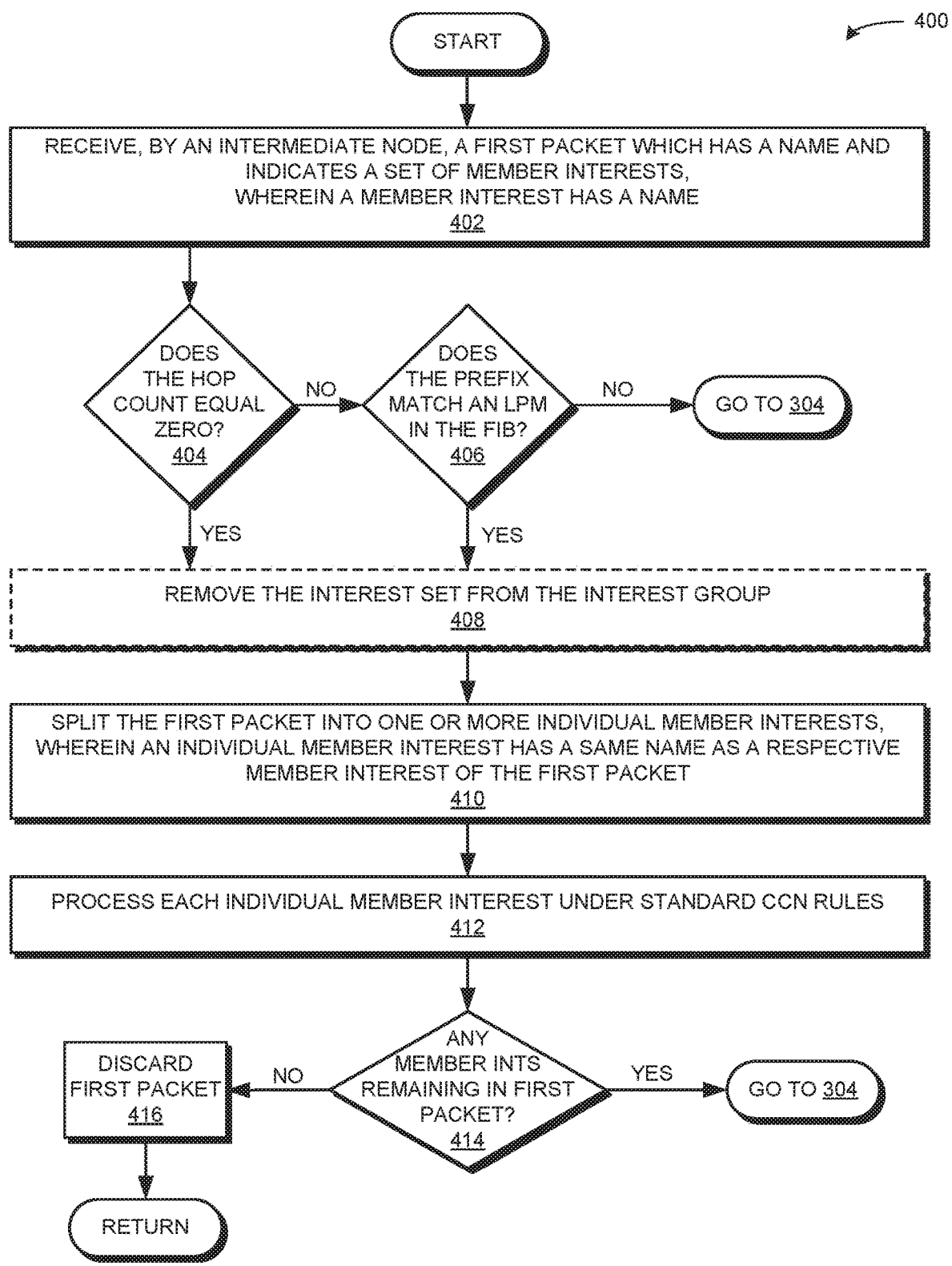
FIG. 4 presents a flow chart illustrating a method by an intermediate node for facilitating communication of an interest group packet indicating a collection of interests, including detection of information associated with a condition to split the interest group packet, in accordance with an embodiment of the present invention.

FIG. 4 presents a flow chart 400 illustrating a method by an intermediate node for facilitating communication of an interest group packet indicating a collection of interests, including detection of information associated with a condition to split the interest group packet, in accordance with an embodiment of the present invention. During operation, the system receives, by an intermediate node, a first packet which has a name and indicates a set of member interests, wherein a member interest has a name (operation 402). The first packet can be a manifest, and the manifest can further indicate a decompose hop count or a decompose prefix. The hop count and the prefix can be associated with the manifest or a set of interests indicated in the manifest. The hop count and the prefix can also be associated with an interest set of an interest group, as described above in relation to FIG. 2. The system determines whether the decompose hop count is equal to zero (decision 404). If the decompose hop count is not equal to zero, the system determines whether the decompose prefix matches a prefix in the FIB based on a longest prefix match method (decision 406). If the prefix has no match in the FIB, the operation continues as described above at operation 304 of FIG. 3A.

If either the decompose hop count is zero (decision 404) or the decompose prefix matches a prefix in the FIB (decision 406), the system can remove the interest set from the interest group (operation 408) (if the hop count or prefix are associated with an interest set of an interest group). The system can split the first packet (manifest) into one or more individual interests, wherein an individual interest has a same name as a respective member interest of the first packet (operation 410). In other words, the system creates a new individual interest for each member interest indicated in the first packet or manifest. The system processes each individual interest under standard CCN rules (operation 412). For example, the system performs a lookup in the CS for a matching content object based on the name for the individual interest. If there is a matching content object, the system forwards the matching content object to a previous-hop node and removes a matching entry from the PIT or removes from the matching PIT entry the arrival interface associated with the individual interest (if there is a matching entry). If there is no matching content object, the system performs a lookup in the PIT for a matching entry. If there is a matching PIT entry, the system adds to the PIT entry the arrival interface associated with the individual interest. If there is no matching PIT entry, the system adds a new PIT entry corresponding to the individual interest. The system also forwards the individual interest.

Upon completing operation 412, the system determines whether there are any remaining member interests indicated in the first packet (decision 414). In some embodiments, if the system removed an interest set from the interest group, the system determines whether there are any interest sets remaining in the interest group. If there are, the system performs decision 414. If there are no remaining member interests indicated in the first packet (or if there are no remaining interest sets in the interest group), the system discards the first packet (operation 416), and the operation returns. If there are remaining member interests indicated in the first packet (decision 414), the operation continues as described at operation 304 of FIG. 3A.

Exemplary Computer and Communication System

Figure 5:
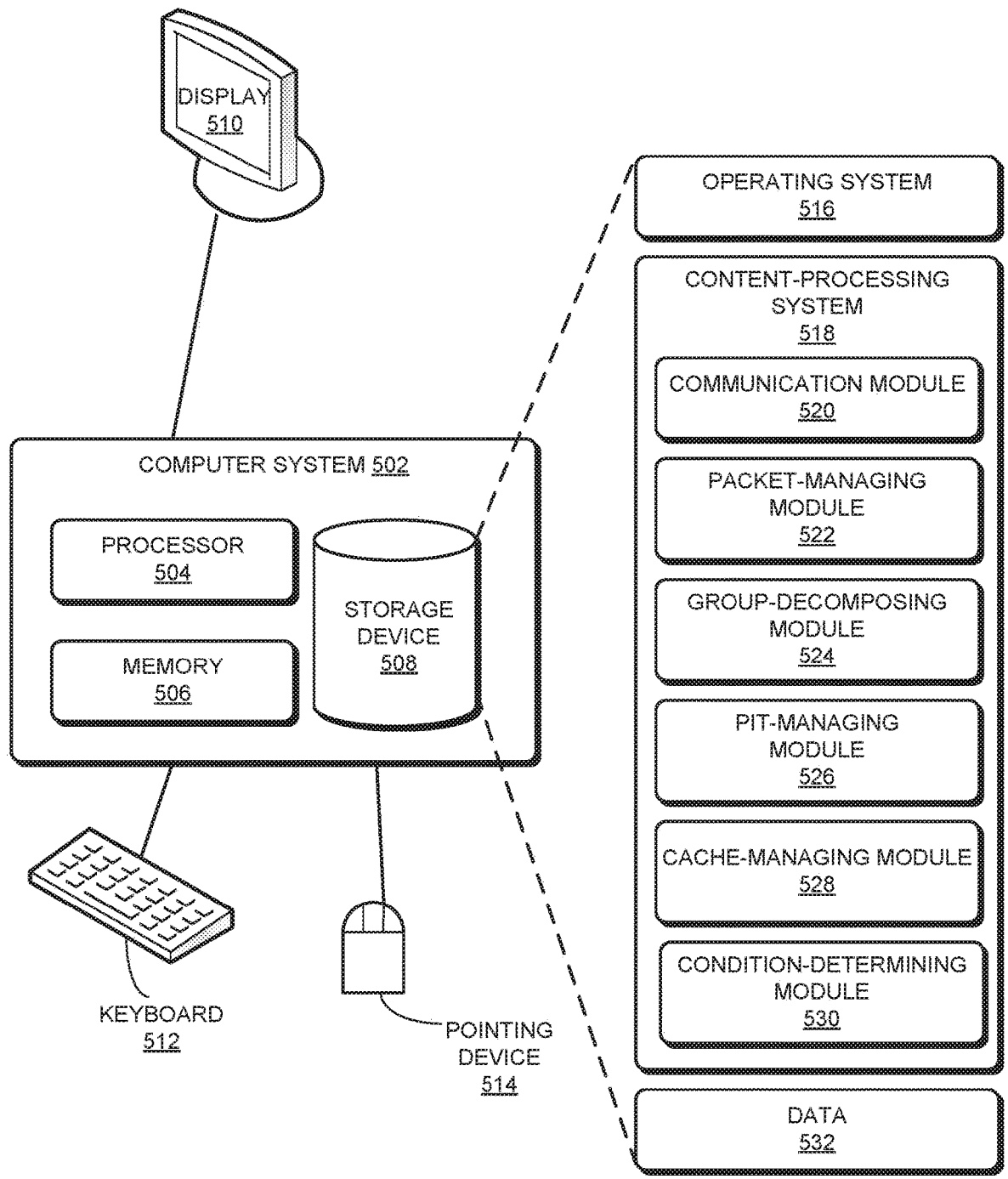
FIG. 5 illustrates an exemplary computer and communication system that facilitates communication of an interest group packet indicating a collection of interests, in accordance with an embodiment of the present invention.

FIG. 5 illustrates an exemplary computer and communication system 502 that facilitates communication of an interest group packet indicating a collection of interests, in accordance with an embodiment of the present invention. Computer and communication system 502 includes a processor 604, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 616, a content-processing system 518, and data 532.

Content-processing system 518 can include instructions, which when executed by computer and communication system 502, can cause computer and communication system 502 to perform methods and/or processes described in this disclosure. Specifically, content-processing system 518 may include instructions for receiving, by an intermediate node, a first packet which has a name and indicates a set of member interests, wherein a member interest has a name (communication module 520). Content-processing system 518 can include instructions for, in response to obtaining a content object which satisfies a member interest, removing the indicated member interest from the first packet (packet-managing module 522). Content-processing system 518 can also include instructions for adding an entry in a PIT for the first packet, wherein the entry indicates the name for the first packet, the name for each member interest, and an indicator of whether each member interest is satisfied (PIT-managing module 526). Content-processing system 518 can include instructions for transmitting the first packet to another node (communication module 520).

Content-processing system 518 can further include instructions for processing one or more individual interests (packet-managing module 522). Content-processing system 518 can include instructions for, in response to determining that a hop count is equal to zero (condition-determining module 530): splitting the first packet into the one or more individual interests (group-decomposing module 524); discarding the first packet (packet-managing module 522); and forwarding the one or more individual interests (communication module 520). Content-processing system 518 can additionally include instructions for, in response to determining that a name prefix matches an entry in a forwarding information base based on a longest prefix match (condition-determining module 530): splitting the first packet into the one or more individual interests (group-decomposing module 524); discarding the first packet (packet-managing module 522); and forwarding the one or more individual interests (communication module 520).

Content-processing system 518 can also include instructions for, in response to obtaining a content object that satisfies a member interest (cache-managing module 528): performing a lookup in the PIT for a matching entry corresponding to the first packet (PIT-managing module 526). Content-processing system 518 can include instructions for, in response to obtaining the matching entry (PIT-managing module 526): marking in the matching entry the indicator that the member interest is satisfied (PIT-managing module

526); and, in response to determining that all member interests indicated in the matching entry are satisfied, removing the matching entry from the PIT (PIT-managing module 526). Content-processing system 518 can further include instructions for, in response to not obtaining the matching entry (PIT-managing module 526), and in response to determining that one or more member interests are indicated in the first packet (packet-managing module 522): adding the entry in the PIT for the first packet, wherein the added entry does not indicate the satisfied member interest (PIT-managing module 526); and forwarding the first packet (communication module 520). Content-processing system 518 can include instructions for, in response to determining that no member interests are indicated in the first packet, discarding the first packet (packet-managing module 522).

Content-processing system 518 can additionally include instructions for, in response to not obtaining a content object which satisfies a member interest (cache-managing module 528), performing a lookup in the PIT for a matching entry corresponding to the first packet (PIT-managing module 526). Content-processing system 518 can include instructions for, in response to obtaining the matching entry, marking in the matching entry the indicator that the member interest is satisfied (PIT-managing module 526). Content-processing system 518 can also include instructions for, in response to not obtaining the matching entry, adding the entry in the pending interest table for the first packet (PIT-managing module 526).

Data 532 can include any data that is required as input or that is generated as output by the methods and/or processes described in this disclosure. Specifically, data 532 can store at least: a packet; a name; an interest group or interest group packet; an interest or interest packet; a content object or content object packet; a set of member interests; a packet which has a name and indicates a set of member interests; a hierarchically structured variable length identifier that includes contiguous name components ordered from a most general level to a most specific level; a name for a packet; a name for an interest; a name for a content object; a name for an interest group; a pending interest table (PIT); an entry in a PIT; an indicator of whether a member interest is satisfied; a condition for splitting a packet into one or more individual interests; information associated with a condition for splitting a packet into one or more individual interests; a hop count; a name prefix; a longest prefix match; a forwarding information base (FIB); a local cache or a content store (CS); and an arrival interface associated with an interest; a lookup in a PIT or CS.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   receiving a first packet which indicates a set of member interests respectively requesting content objects to satisfy the member interests, wherein the first packet includes a condition for splitting the first packet into one or more subsets of the set of member interests;
   determining whether the condition for splitting the first packet has occurred; and
   in response to determining that the condition for splitting the first packet has occurred:
   splitting the first packet into the one or more subsets of the set of member interests;
   discarding the first packet; and
   forwarding the one or more subsets of the set of member interests.

2. The method of claim 1, wherein splitting the first packet into the one or more subsets of the set of member interests includes splitting the first packet into individual interests respectively corresponding to one or more member interests of the set of member interests.

3. The method of claim 1, wherein splitting the first packet into the one or more subsets of the set of member interests includes splitting the first packet into one or more sets of member interests each of which include one or more member interests of the set of member interests.

4. The method of claim 1, wherein splitting the first packet into the one or more subsets of the set of member interests includes splitting the first packet into subsets of individual interests respectively corresponding to one or more member interests of the set of member interests.

5. The method of claim 1, wherein determining whether the condition for splitting the first packet has occurred includes determining whether a hop count is equal to a predetermined number, wherein the hop count indicates a number of hops taken by the first packet.

6. The method of claim 1, wherein determining whether the condition for splitting the first packet has occurred includes determining whether a specified name prefix matches an entry in a forwarding information base.

7. The method of claim 1, wherein determining whether the condition for splitting the first packet has occurred includes determining whether the first packet has reached a topological portion of a network.

8. An apparatus comprising:
   a processor; and
   a storage device storing instructions that when executed by the processor cause the processor to:

receive a first packet which indicates a set of member interests respectively requesting content objects to satisfy the member interests, wherein the first packet includes a condition for splitting the first packet into one or more subsets of the set of member interests;

determine whether the condition for splitting the first packet has occurred; and in response to determining that the condition for splitting the first packet has occurred:
- split the first packet into the one or more subsets of the set of member interests;
- discard the first packet; and
- forward the one or more subsets of the set of member interests.

9. The apparatus of claim 8, wherein the instructions further cause the processor to split the first packet into individual interests respectively corresponding to one or more member interests of the set of member interests.

10. The apparatus of claim 8, wherein the instructions further cause the processor to split the first packet into one or more sets of member interests each of which include one or more member interests of the set of member interests.

11. The apparatus of claim 8, wherein the instructions further cause the processor to split the first packet into subsets of individual interests respectively corresponding to one or more member interests of the set of member interests.

12. The apparatus of claim 8, wherein the instructions further cause the processor to determine whether a hop count is equal to a predetermined number, wherein the hop count indicates a number of hops taken by the first packet.

13. The apparatus of claim 8, wherein the instructions further cause the processor to determine whether a specified name prefix matches an entry in a forwarding information base.

14. The apparatus of claim 8, wherein the instructions further cause the processor to determine whether the first packet has reached a topological portion of a network.

15. A non-transitory computer-readable storage medium storing instructions that when executed by a processor cause the processor to:

receive a first packet which indicates a set of member interests respectively requesting content objects to satisfy the member interests, wherein the first packet includes a condition for splitting the first packet into one or more subsets of the set of member interests;

determine whether the condition for splitting the first packet has occurred; and in response to determining that the condition for splitting the first packet has occurred:
- split the first packet into the one or more subsets of the set of member interests;
- discard the first packet; and
- forward the one or more subsets of the set of member interests.

16. The storage medium of claim 15, wherein the instructions further cause the processor to split the first packet into individual interests respectively corresponding to one or more member interests of the set of member interests.

17. The storage medium of claim 15, wherein the instructions further cause the processor to split the first packet into one or more sets of member interests each of which include one or more member interests of the set of member interests.

18. The storage medium of claim 15, wherein the instructions further cause the processor to split the first packet into subsets of individual interests respectively corresponding to one or more member interests of the set of member interests.

19. The storage medium of claim 15, wherein the instructions further cause the processor to determine whether a hop count is equal to a predetermined number, wherein the hop count indicates a number of hops taken by the first packet.

20. The storage medium of claim 15, wherein the instructions further cause the processor to determine whether a specified name prefix matches an entry in a forwarding information base.

* * * * *